Patented Jan. 1, 1946

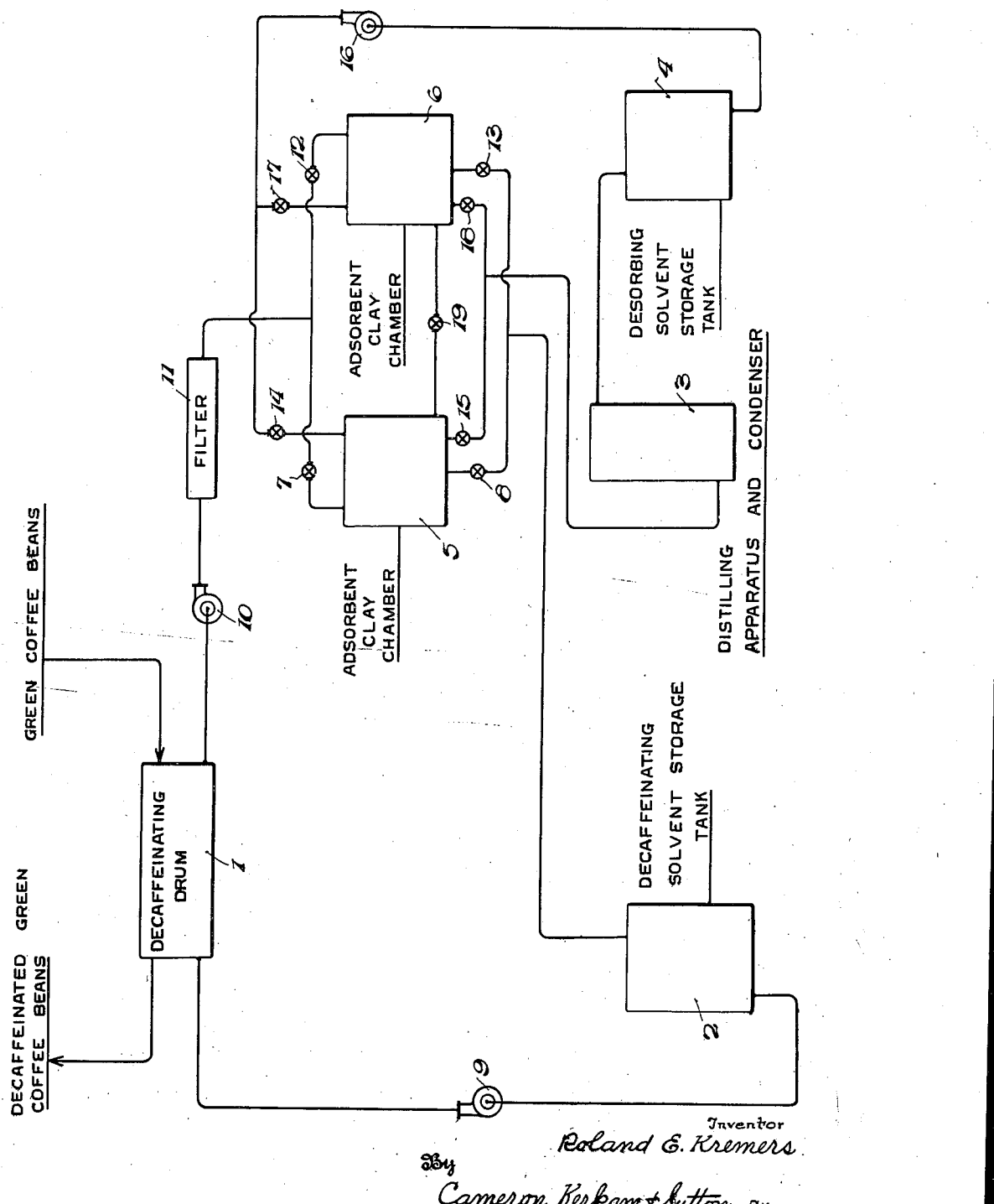

2,391,981

UNITED STATES PATENT OFFICE 2,391,981

PROCESS OF RECOVERING CAFFEIN

Roland E. Kremers, Summit, N. J., assignor to General Foods Corporation, New York, N. Y., a corporation of Delaware Application January 12, 1943, Serial No. 472,175

7 Claims. (Cl. 260—256)

This invention relates to the removal and recovery of caffein from its solution in organic solvents, particularly solvents which are used for the decaffeination of coffee.

Caffein is usually extracted from coffee beans by a chlorinated solvent such as trichlorethylene which is then distilled to separate the caffein and re-used to extract a further quantity of beans. For efficient extraction, and particularly in order to remove all but negligible amounts of caffein from the coffee, it is necessary to employ large volumes of solvent, and the cost of distillation is correspondingly large. In addition, processing costs are increased by some loss of solvent during distillation.

One of the principal objects of the present invention is to eliminate the necessity for distilling such large volumes of solvent, and to this end I propose to remove the caffein from the extracting solvent by adsorption on a suitable medium and then to desorb it therefrom by means of a solvent of much smaller volume than the extracting solvent. It is known that alkaloids such as morphine can be adsorbed on and desorbed from clay as a base exchange reaction involving an acidified adsorbing solution and an alkaline desorbing solution. It is also known that caffein itself can be adsorbed from its aqueous solutions, but that it is only slightly adsorbed from alcohol, and it has been found that the base exchange method when applied to caffein is so low in effectiveness that it is not practical for commercial use in operations such as the decaffeination of coffee.

Accordingly another object of the invention is to provide a novel process combining great effectiveness in both adsorption and desorption of caffein.

A further object is to provide a process of the type characterized above which is readily adaptable to previous coffee decaffeination technic without substantial modification thereof.

A still further object is to provide a novel process which not only is effective in adsorption and desorption of caffein, but in which the adsorbing and desorbing solutions are correlated in such a way that problems of handling the solutions to avoid mixing, contamination, and the like are eliminated.

Another object is to enable a reduction in the quantity of decaffeinating solvent required in batch processes of extracting coffee.

The invention is predicated on the discoveries that caffein is adsorbed by clay very effectively from chlorinated organic solvents of relatively low polarity or di-pole moment, and conversely that it is desorbed from clay very effectively by non-chlorinated organic solvents of relatively high polarity or di-pole moment. The correlation of these discoveries makes it possible to use simple adsorption and desorption methods to separate the caffein from the extracting solvent and to recover it from the adsorbing medium, while providing at the same time a very effective process having the advantages mentioned above.

In carrying out this process, the decaffeinating solvent is preferably circulated through the beans to be extracted and also the adsorbing medium. Thus the caffein is removed from the circulating solvent as it is extracted from the coffee, and in batch extraction procedures, a substantially smaller quantity of solvent is required to produce the same degree of extraction of a given quantity of coffee. However, regardless of the method of extraction employed the quantity of desorbing solvent needed to remove the caffein from the clay, and in the end distilled to recover the caffein, is much less than the quantity of decaffeinating solvent used. As compared with the procedure now generally used, therefore, a process embodying the present invention has marked advantages in solvent economy and distillation costs.

Furthermore, this method is readily adaptable to existing procedures, inasmuch as the solvents now commonly used for decaffeination of coffee are those which are especially desired for adsorption, i. e., chlorinated organic solvents of relatively low polarity such as trichlorethylene, carbon tetrachloride, methylene chloride, ethylene dichloride, chloroform, etc. On the other hand, non-chlorinated organic solvents of relatively high polarity, which are effective for desorption, are readily available, such as methyl alcohol, ethyl alcohol, acetone, methyl acetate, pyridine, aniline, piperidine, ethanolamine, diethanolamine, etc. These two classes of solvents are respectively described hereinafter and in the claims by the terms "relatively low polarity" and "relatively high polarity," the meaning of which will be clear by the foregoing examples. Solvents in both of these classes are theoretically capable of being used either for adsorption or for desorption, but their effectiveness varies greatly and correlation of members of the two classes in the manner explained above is necessary to secure the results set forth and to provide a practical and economical process.

The effectiveness of adsorption and desorption according to the invention and the practical results which can be obtained are illustrated by the following examples:

*Example 1*

200 cc. of trichlorethylene, 20 gms. of clay and 100 gms. of green coffee beans containing 35% moisture by weight, were continuously agitated together for 48 hours, during which time the trichlorethylene extracted caffein from the coffee beans and in turn lost it to the clay by adsorption. At the end of the treatment the bulk of the solvent was drained off and residual clay was rinsed away from the beans with a little additional solvent. A caffein assay showed that 89% of the caffein was removed from the beans and adsorbed on the clay. Still more extraction would have been obtained by increasing the ratio of clay to coffee. Without clay, on the other hand, and although the amount of solvent was increased to 714 cc., or more than three times as much, only 60% extraction was obtained.

*Example 2*

20 liters of trichlorethylene containing about 0.1% by weight of caffein and 0.1% by weight of coffee wax in solution, or approximately what the solvent would contain in extraction procedures as now generally practiced, were pumped through two adsorbent clay chambers connected in series. Each chamber contained 280 gms. of a mixture of 75% clay with 25% filter aid used to facilitate passage of the trichlorethylene through the clay. All of the caffein was adsorbed by the clay.

*Example 3*

6.0 gms. of clay containing 0.80 gm. of adsorbed caffein were agitated with 100 cc. of methanol. After filtration of the methanol from the clay, analysis showed that 0.52 gm. of caffein, or 65% of that originally adsorbed on the clay, had been desorbed.

*Example 4*

6.0 gms. of clay containing 0.82 gm. of adsorbed caffein were agitated with 100 cc. of acetone. After filtration of the acetone from the clay, analysis showed that 0.44 gm. of caffein, or 55% of that originally adsorbed on the clay, had been desorbed.

*Example 5*

Twenty liters of trichlorethylene containing about 0.1% by weight of caffein and 0.1% by weight of coffee wax in solution were pumped through two clay chambers, as in Example 2, and all of the caffein was adsorbed on the clay. Desorption of the total amount of caffein was accomplished by pumping four liters of a mixture of approximately equal volumes of trichlorethylene and methanol through the chambers. The caffein was then recovered by distilling the desorbing solvent. Thus it will be seen that, whereas the recovery of caffein from its original solution in trichlorethylene as now practiced would have required distilling 20 liters of this solvent, the use of the adsorbing and desorbing procedures enabled the recovery of the caffein by distillation of only four liters of desorbing solvent. It is estimated that the corresponding reduction in heat requirement was about 65%.

As indicated by the foregoing example, the invention is not limited to the use of single solvents for either adsorption or desorption. I have found that, insofar as the desorption of caffein is concerned, mixtures of solvents may be equally as effective as, and in some cases more effective than, their individual components, provided that such mixtures include at least one component of relatively high polarity. The effectiveness for desorption of some mixtures of solvents of relatively high polarity is shown in Table 1, while Table 2 shows the effectiveness for desorption of some mixtures of solvents of relatively high and low polarity. The conditions under which these tests were carried out were the same as for Examples 3 and 4.

*Table 1*

| Composition of mixture by volume | Per cent of caffein desorbed |
|---|---|
| 50% methanol—50% acetone | 86 |
| 40% methanol—40% acetone—20% methyl acetate | 81 |
| 50% "Methyl Acetone" (commercial mixture of methanol, acetone, and methyl acetate)—50% methanol | 79 |

*Table 2*

| Composition of mixture by volume | Per cent of caffein desorbed |
|---|---|
| 50% methanol—50% trichlorethylene | 70 |
| 50% methanol—50% dichlormethane | 75 |
| 30% methanol—30% acetone—40% dichlormethane | 80 |

For adsorption I prefer to use trichlorethylene, not only because it is highly effective, but also because of characteristics which make it desirable for use in the decaffeination of coffee. It is non-corrosive, non-inflammable and relatively non-toxic, it has a suitable boiling point, and it is a stable solvent having substantially no deleterious effect on the coffee or the caffein extracted therefrom. It is also immiscible in water and has a low latent heat of evaporation, and in addition, its cost is low as compared to other chlorinated solvents.

For desorption I prefer to use a minimum boiling point azeotropic mixture comprising one or more non-chlorinated organic solvents of relatively high polarity and also the particular chlorinated solvent employed for decaffeination and adsorption. Because such a mixture can admix with the adsorbing solvent and yet a mixture of the original azeotropic composition will be produced on distillation, the desorbing mixture may be passed through the clay immediately after adsorption without first washing the clay to remove any remaining adsorbing solvent, and any desorbing mixture remaining on the clay after desorption may be washed off with the adsorbing solvent and the washings distilled along with the desorbing mixture. These features are explained in greater detail as part of the operating procedure hereinafter described.

Thus when trichlorethylene is used for decaffeination and adsorption as explained above, the minimum boiling-point azeotropic mixture preferably employed for desorption also contains trichlorethylene. Such mixtures are preferred not only because of the advantages set forth above, but also because they are less inflammable than their non-chlorinated component or components. For example, a mixture consisting of approximately equal volumes of trichlorethylene and methanol is highly effective for desorption as shown by Table 2 and, in contrast to methanol, is practically non-inflammable.

Various known adsorbent clays are suitable for use in the present process, although their effectiveness, for the adsorption of caffein varies considerably. I prefer to use fuller's earths of the hydrous aluminum silicate type of "Lloyd's Reagent," which have thus far been found most effective. These clays are relatively strong buffers for both acid and alkaline solutions, and in general tend to have a pH of 7 or greater measured after equilibrium has been established with the caffein solution. Examples of suitable clays now obtainable on the market are "Lloyd's Reagent," "Magnesol" (a synthetic magnesium silicate), various types of "Filtrol" (an activated natural product), and other fuller's earths such as those marketed under the designations "XL Superfine English Fuller's Earth," "XL," "FP," and "OK" fuller's earths, "XL Fuller's Earth #1, #2, #3, #4, #5," etc.

Procedures suitable for the practice of my invention will now be described in connection with the flow sheet shown in the accompanying drawing, it being understood that these procedures are given by way of illustration and example only and are not to be construed as limiting the scope of my invention, reference being had for the latter purpose to the appended claims.

Green coffee beans, moistened by steam or moisture in accordance with the usual practice in the art, are charged in a decaffeinating drum 1. Decaffeinating solvent, such as trichlorethylene, is stored in a tank 2, and desorbing solution, such as the mixture of trichlorethylene and methanol referred to above, is distilled and condensed at 3 and stored in tank 4. The adsorbing and desorbing chambers 5 and 6 are charged with one or more of the clays referred to above, and the system is completed by a suitable arrangement of pumps, pipes and valves depending on the type of operation to be carried out.

For example, assuming all valves closed except 7 and 8, trichlorethylene is pumped by means of pump 9 from storage tank 2 to drum 1 where it extracts the caffein from the beans. By means of pump 10 the caffein-containing trichlorethylene is pumped from the drum 1 through filter 11, which removes any insoluble foreign matter which may have been picked up from the coffee, and thence through valve 7 to chamber 5, where the dissolved caffein is adsorbed. The caffein-free solvent then passes through valve 8 back to the storage tank 2. The trichlorethylene is passed through chamber 5 until caffein begins to appear in the outgoing solvent, at which time it is diverted to the second clay chamber 6 by opening valves 12 and 13 and closing valves 7 and 8. The caffein adsorption process thus continues without interruption.

The caffein adsorbed in chamber 5 may now be desorbed by opening valves 14 and 15, the desorbing mixture being pumped by means of pump 16 from storage tank 4 through chamber 5 and back to the distilling apparatus 3, and carrying with it the desorbed caffein and also the small amount of trichlorethylene remaining on the clay from the previous operation of adsorption. Any desorbing mixture remaining in chamber 5 after desorption may then be washed out by closing valve 14, opening valve 7, and allowing an appropriate amount of trichlorethylene to pass through chamber 5 and through valve 15 to the distilling apparatus 3.

Following the washing out of the residual desorbing mixture in chamber 5, valve 15 is closed and valve 8 opened, so that caffein is again adsorbed in chamber 5 as described above. Then by closing valves 12 and 13 and opening valves 17 and 18, the caffein in chamber 6 may be desorbed as described above for chamber 5, any desorbing mixture remaining in chamber 6 after desorption being washed out by closing valve 17 and opening valve 12. Thus, a continuous process of adsorption and desorption is maintained.

It will be noted that, due to the washing out of residual trichlorethylene by the desorbing mixture and of residual desorbing mixture by trichlorethylene, the decaffeinating solvent is not contaminated with desorbing mixture, but on the other hand the liquid entering the distilling apparatus becomes richer in trichlorethylene than the desorbing mixture stored in tank 4. However, since this mixture has a minimum boiling point azeotropic composition, the condensed vapor leaving the distilling apparatus 3 is of the same composition and hence may be returned directly to the tank 4 for re-use, the excess trichlorethylene remaining in the distilling apparatus.

The caffein-containing residue may be removed from the distilling apparatus either continuously or at regular intervals, as desired, and separated into its components in any suitable way. This residue will ordinarily contain some coffee wax, which is removed from the coffee and adsorbed on and desorbed from the clay along with the caffein. Hence the mixture may be subjected to steam distillation to remove the trichlorethylene, and the remaining aqueous sludge having caffein in solution and wax in suspension may be transferred to a settling tank where the wax separates as an upper layer and is skimmed off. The caffein solution may then be treated with charcoal for the removal of discoloring impurities and the caffein finally separated by crystallization and subsequently purified.

While the foregoing procedures have been described in connection with two clay chambers connected in parallel, it will be understood that any number of chambers connected in either parallel or series may be employed. In many cases, for example, it may be desirable to employ chambers in series or groups and to operate them for adsorption and/or desorption, in accordance with well-known countercurrent principles. For example, the chambers 5 and 6 shown in the accompanying flow sheet may first be connected in series for the passage of the adsorbing solution by opening valves 7, 19 and 13. After a desired period, chamber 5 may be disconnected by closing valves 7 and 19, and the adsorbing solution may continue to pass through chamber 6 if desired by opening valve 12. Desorbing solvent may now be passed through chamber 5 by opening valves 14 and 15. After desorption and washing out as explained above, chamber 5 may be made the second chamber in the series by closing valves 14 and 15, opening valves 19 and 8, and closing valve 13. Thereafter chamber 6 may be similarly disconnected, desorbed, and reconnected as the second chamber in the series. Thus a countercurrent adsorption effect may be attained.

Alternatively, the two chambers may be desorbed in series by opening valves 17, 19 and 15, or valves 14, 19 and 18. Thus the caffein may be successively adsorbed in and desorbed from both chambers in series, the directions of flow being controlled as desired.

The results obtainable with a countercurrent adsorption procedure are illustrated by the following test runs. Two clay chambers were used, each being filled with 370 gms. of a mixture of 75% "XL Superfine English Fuller's Earth" and 25% "Hy Flo Super Cel" which served merely as a filter aid to facilitate passage of the solutions through the clay. For each adsorption, 20 liters of trichlorethylene containing 28 gms. each of caffein and coffee wax were passed in series through the chambers, the direction of flow being reversed for each adsorption as explained above. Following each adsorption, the first chamber in the series was desorbed by pumping through it 4 liters of a mixture of equal volumes of trichlorethylene and methanol, this chamber then being reconnected as the second chamber in the series for the subsequent adsorption. In one instance, however, both chambers were desorbed simultaneously. Analyses for caffein and coffee wax were made on the adsorbing solution both before and after each adsorption, and on the desorbing solution after each desorption. Twelve cycles of adsorption and desorption produced the following results:

Table 3.—Caffein

| | Adsorption | | | Desorption | | |
|---|---|---|---|---|---|---|
| | Grams in | Grams out | Grams adsorbed | Chamber desorbed | Grams desorbed | Net grams left on clay |
| (1) | 28.6 | 0.0 | 28.6 | 1 | 26.6 | 2.0 |
| (2) | 31.0 | 0.0 | 31.0 | 2 | 27.8 | 5.2 |
| (3) | 31.0 | 0.0 | 31.0 | 1 | 25.6 | 10.6 |
| (4) | 30.2 | 0.4 | 29.8 | 2 | 24.5 | 15.9 |
| (5) | 27.9 | 0.0 | 27.9 | 1 | 23.9 | 19.9 |
| (6) | 29.9 | 0.1 | 29.8 | 2 | 26.4 | 23.3 |
| (7) | 29.0 | 0.3 | 28.7 | 1 & 2 | 40.8 | 11.2 |
| (8) | 28.8 | 0.0 | 28.8 | 2 | 27.0 | 13.0 |
| (9) | 26.1 | 0.0 | 26.1 | 1 | 25.2 | 13.9 |
| (10) | 27.2 | 0.0 | 27.2 | 2 | 22.9 | 18.2 |
| (11) | 30.2 | 0.0 | 30.2 | 1 | 24.5 | 23.9 |
| (12) | 28.8 | 0.12 | 28.7 | 2 | 25.4 | 27.2 |
| | | | | 1 | 17.8 | 9.4 |

Table 4.—Wax

| | Adsorption | | | Desorption | | |
|---|---|---|---|---|---|---|
| | Grams in | Grams out | Grams adsorbed | Chamber desorbed | Grams desorbed | Net grams left on clay |
| (1) | 28.0 | 9.5 | 18.5 | 1 | 9.7 | 8.8 |
| (2) | 37.6 | 18.8 | 18.8 | 2 | 9.5 | 18.1 |
| (3) | 43.0 | 28.8 | 14.2 | 1 | 14.5 | 17.8 |
| (4) | 56.4 | 42.2 | 14.2 | 2 | 15.0 | 17.0 |
| (5) | 61.4 | 47.7 | 13.7 | 1 | 14.3 | 16.4 |
| (6) | 69.1 | 55.8 | 13.3 | 2 | 13.6 | 16.1 |
| (7) | 77.6 | 63.4 | 14.2 | 1 & 2 | 26.7 | 3.6 |
| (8) | 90.0 | 63.8 | 26.2 | 2 | 14.1 | 15.7 |
| (9) | 92.2 | 75.5 | 16.7 | 1 | 16.8 | 15.6 |
| (10) | 104.9 | 87.3 | 17.6 | 2 | 17.2 | 16.0 |
| (11) | 110.9 | 94.8 | 16.1 | 1 | 18.1 | 14.0 |
| (12) | 127.2 | 110.2 | 17.0 | 2 | 19.4 | 11.6 |
| | | | | 1 | 16.4 | 4.8 |

It will be observed from these tables that the adsorption of caffein from the trichlorethylene was completely effective, and that while desorption left a small amount of caffein on the clay, there was no substantial loss of caffein over the entire test. A total of approximately 348 gms. of caffein were adsorbed by the clay, whereas after desorption of both chambers at the end of the test, only 9.4 gms. remained on the clay. Had the test been continued over a greater number of cycles, this loss would have been proportionately smaller. At the same time the volume of desorbing solvent to be distilled was only one-fifth that of the decaffeinating solvent.

Moreover, in the case of batch extraction with continuously circulating decaffeinating solvent, as explained in Example 1, the amount of decaffeinating solvent could have been materially reduced without sacrifice of efficiency.

Table 3 also shows that only a relatively small part of the coffee wax in the decaffeinating solvent was adsorbed on and desorbed from the clay, so that the problem of separating caffein and coffee wax was simplified to a corresponding degree. The concentration of coffee wax in the decaffeinating solvent accordingly increased, but did not in any way interfere with the effectiveness of adsorption or desorption of caffein.

It will be understood that the examples and procedures given above are for purposes of illustration only and that various substitutions and changes within the spirit of the invention will now be apparent to those skilled in the art. Reference should therefore be had to the appended claims for a definition of the limits of the invention.

What is claimed is:

1. A process for decaffeinating coffee and recovering the caffein which comprises dissolving the caffein from the coffee in a chlorinated organic solvent of relatively low polarity, adsorbing the caffein from said solvent on clay, desorbing the caffein from the clay by a non-chlorinated organic solvent of relatively high polarity, and recovering the caffein from said second solvent.

2. A process for decaffeinating coffee and recovering the caffein which comprises dissolving the caffein from the coffee in a chlorinated organic solvent of relatively low polarity, adsorbing the caffein from said solvent on clay, desorbing the caffein from the clay by a mixture of solvents containing at least one non-chlorinated organic solvent of relatively high polarity, and recovering the caffein from said mixture of solvents.

3. A process for decaffeinating coffee and recovering the caffein which comprises dissolving the caffein from the coffee in a chlorinated organic solvent of relatively low polarity, adsorbing the caffein from said solvent on clay, desorbing the caffein from the clay by a mixture of solvents containing at least one non-chlorinated organic solvent of relatively high polarity and also said chlorinated solvent and comprising a minimum boiling point azeotropic mixture, and distilling the caffein-containing mixture to separate the caffein and said azeotropic mixture.

4. A process for decaffeinating coffee and recovering the caffein which comprises dissolving the caffein from the coffee in a chlorinated organic solvent of relatively low polarity, adsorbing the caffein from said solvent on clay, desorbing the caffein from the clay by a mixture of said solvent and a non-chlorinated organic solvent of relatively high polarity in minimum boiling point azeotropic proportions, washing the desorbed clay with said chlorinated solvent, and distilling the combined washings and mixture of solvents to separate said mixture of solvents from the caffein.

5. In a method of recovering caffein from its solution in a chlorinated organic solvent of relatively low polarity, the steps of adsorbing the caffein from its solution on clay, desorbing the caffein from the clay by a non-chlorinated solvent of relatively high polarity, and recovering the caffein from said second solvent.

6. In a method of recovering caffein from its solution in a chlorinated organic solvent of relatively low polarity, the steps of adsorbing the caffein from its solution on clay, desorbing the caffein from the clay by a mixture of said solvent and a non-chlorinated organic solvent of relatively high polarity in minimum boiling point azeotropic proportions, and distilling the desorbing solution to separate said mixture from the caffein.

7. A batch process for decaffeinating coffee which comprises circulating a chlorinated organic caffein solvent of relatively low polarity through a batch of coffee and a clay adsorbent for caffein until the desired amount of caffein has been extracted from the coffee and adsorbed on the clay, and thereafter desorbing the caffein from the clay by a non-chlorinated organic solvent of relatively high polarity and recovering the caffein therefrom.

ROLAND E. KREMERS.